June 17, 1952          E. BLAIR          2,600,834

CUTTING SHEET MATERIAL INTO BLANKS

Filed Dec. 24, 1947          2 SHEETS—SHEET 1

INVENTOR.
EMILE BLAIR.
BY Austin, Wilhelm + Carlson
ATTORNEYS

June 17, 1952     E. BLAIR     2,600,834
CUTTING SHEET MATERIAL INTO BLANKS
Filed Dec. 24, 1947     2 SHEETS—SHEET 2
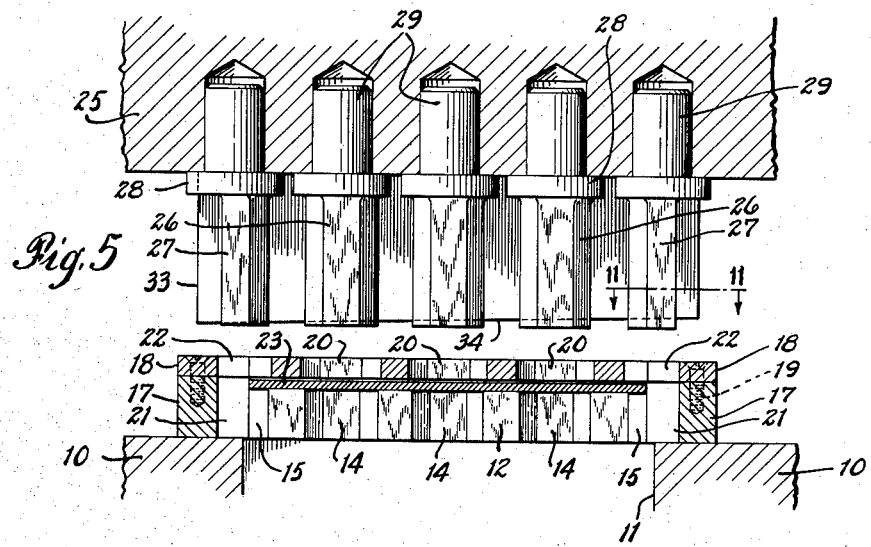
Fig. 5
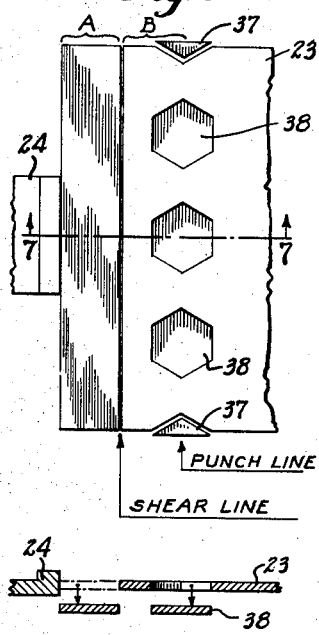
Fig. 6
Fig. 7
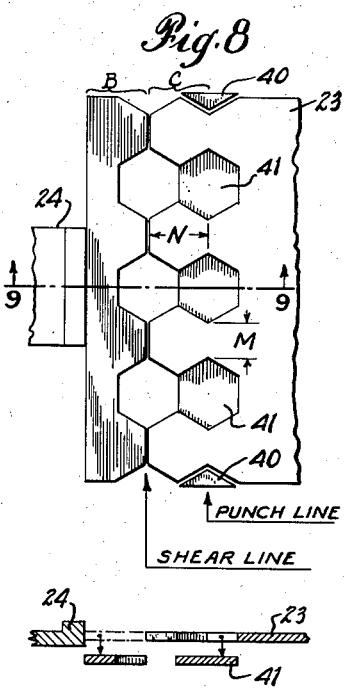
Fig. 8
Fig. 9
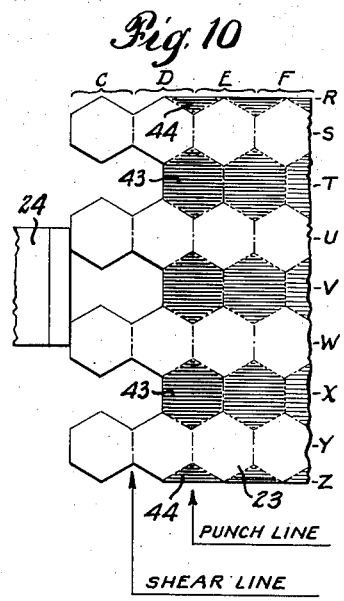
Fig. 10
Fig. 11
INVENTOR:
EMILE BLAIR
BY
Austin, Wilhelm + Carlson
ATTORNEYS Patented June 17, 1952

2,600,834

UNITED STATES PATENT OFFICE 2,600,834

CUTTING SHEET MATERIAL INTO BLANKS

Emile Blair, New Haven, Conn., assignor to Olin Industries, Inc.

Application December 24, 1947, Serial No. 793,715

5 Claims. (Cl. 164—17)

The invention relates to cutting up sheet or plate material into blanks and, more particularly, to making metal blanks of hexagonal shape.

It is already known that making such metal blanks of hexagonal shape reduces cutting waste; also that the six sided shape is advantageous, as the starting product, in certain processes for extruding hollow articles such as cartridge shells.

Among the objects of the present invention are to cut hexagonal blanks from the stock sheet quickly and efficiently, with a minimum of stock waste and with fewest separate operations.

The invention, in its preferred form, utilizes a press having an upper movable head and a lower stationary die. The upper head comprises a row of hexagonal punches and a single shear blade. The die has a series of die openings cooperating with the punches, and a shearing edge cooperating with the shear blade.

The row of punches and the shearing edges are so spaced and arranged that hexagonal blanks are formed by simply feeding sheet stock, step-by-step, into the press when the head is in upper position, between successive passes of the press. The hexagonal punches punch out spaced columns of hexagonal blanks, leaving projecting columns of partially formed blanks therebetween, which latter are cut off by the shearing edges. Thus, the punching and shearing operation completely cuts up the stock into hexagonal blanks with a minimum of scrap and without requiring any additional severing or forming operations.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a longitudinal vertical section on the central plane (line I—I) of Fig. 3 showing the punches on way down;

Fig. 5 is a transverse section, on line 5—5 of Fig. 1;

Fig. 6 is a plan of the stock, after the very first pass of the press on a new piece of stock;

Fig. 7 is a section, on line 7—7 of Fig. 6, showing sheared strip and punched pieces;

Fig. 8 is a plan of the stock, after the second pass of the press;

Fig. 9 is a section, on line 9—9 of Fig. 8, showing second sheared strip and punched pieces;

Fig. 10 is a purely diagrammatic plan of the stock illustrating the pieces formed by the third and successive passes of the press; and Fig. 11 is a section, on line 11—11 of Fig. 5, to show shape of the two outside punches which produce the waste end pieces.

Figure 1:
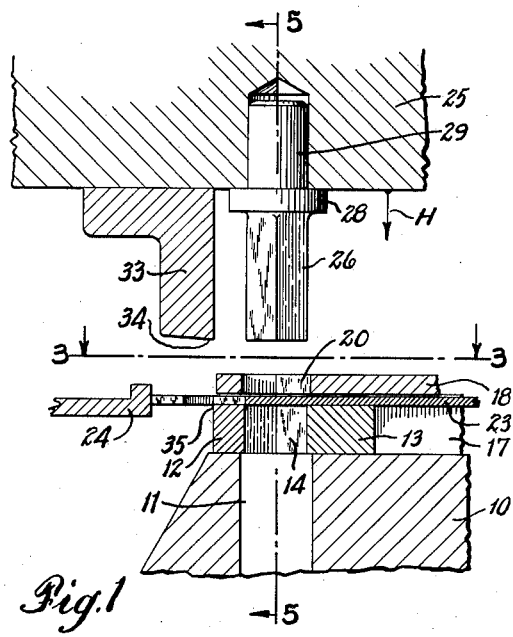

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

The construction of the press will first be described. The word "hex" is sometimes used in the specification and claims to denote both the forming of hexagonal blanks and to denote the blanks themselves.

Figure 2:
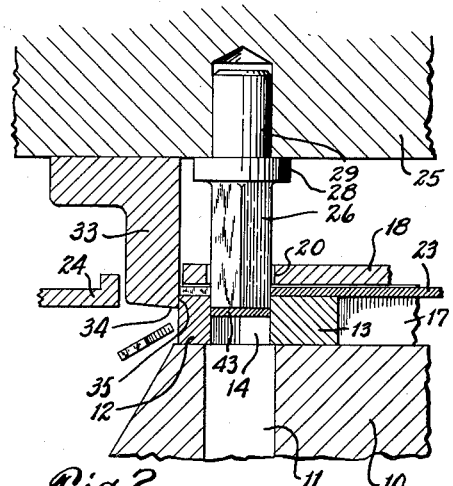
Fig. 2 is a view like Fig. 1, but with the punches down.
Figure 3:
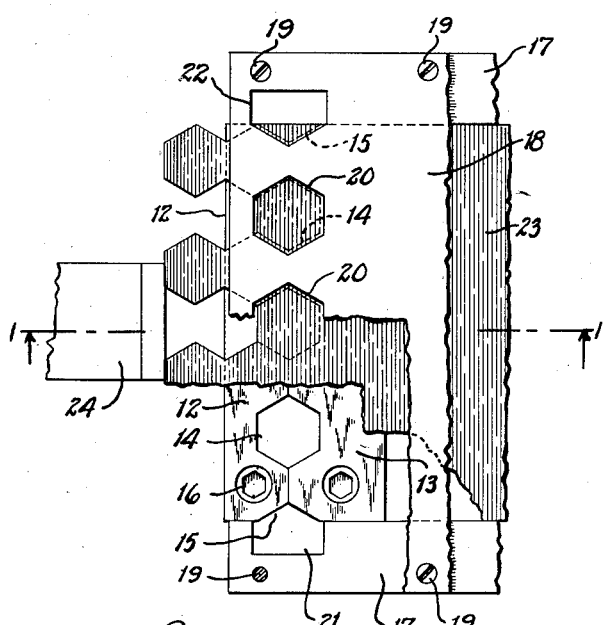
Fig. 3 is a plan section, on line 3—3 of Fig. 1, showing the sheet stock in the middle of a run, and before a punching and shearing operation.
Figure 4:
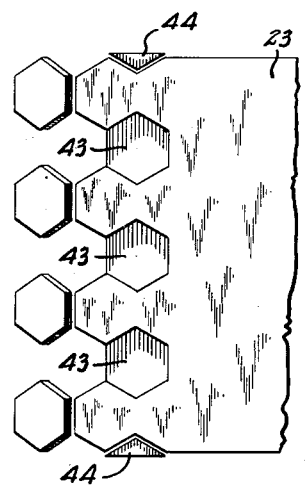
Fig. 4 is a plan view of the stock only, as shown in Fig. 2, but after punching and shearing.

Referring more particularly to Figures 1 to 5, the press comprises, in general, a stationary lower bolster or support 10, supporting the die sections 12, 13, and an upper vertically movable head 25 supporting the several punches 26, 27 and shear blade 33. As the head 25 moves downwardly in the direction of the arrow H, the punches 26, 27 enter the die openings 14 and 15, and the shearing edge 34 on blade 33 slides past the shearing edge 35 on die section 12. This operation punches out certain pieces and cuts off other pieces in a manner described more in detail hereinafter.

The bolster or support 10 has a long opening 11 under the several openings 14 and 15 in the die sections 12, 13. The main openings 14 are hexagonal in cross section and cooperate with punches 26 which have similar cross section to punch out the hex blanks. The end openings 15 are angular grooves cut in the end walls of the die and are complementary to openings 21 in guide bars 17 to accommodate pentagonal end punches 27. These pentagonal punches and angular die openings form the triangular waste pieces discussed below.

The die is formed in the two parts 12 and 13. That is to say, it is a split die which fits together to form the hexagonal and angular openings. This construction facilitates the manufacture of the die; the recesses in the two die halves being machined at the same time. The two die halves are fitted together and suitably fastened to the bolster 10 as by bolts 16.

Alongside the die sections 12, 13 are guide bars 17 on the top of which rests a stripper plate 18 connected to the guide bars by screws 19. The stock 23 is fed between the stripper plate 18 and die 12, 13. The guide bars 17 guide the stock and space the stripper plate slightly above the stock.

The stripper plate 18 has hexagonal openings 20 in register with the hexagonal die openings 14 and slightly larger than the die openings. The stripper plate also has pentagonal end openings 22 which are in register with and slightly larger than the complementary openings 15 and 21.

The function of the stripper 18 is to free the row of punches from the stock during the upward stroke of the press.

The stock 23 may be fed either by hand, or automatically, through the space between the die 12, 13 and stripper 18 until it engages a stationary stop 24. The width of the stock 23 corresponds to the distance between guide bars 17.

The head 25 carries the hexagonal inner punches 26 and the pentagonal end punches 27. The punches have collars 28, and shanks 29 seated in recesses in the head 25. The shear blade 33 is also attached to the movable head 25. This blade has a shearing edge 34 cooperating with a shearing edge 35 on the forward side of die section 12. The stripper plate and guide bars have clearance with the movable shear blade 33.

The lower edge of the shear blade 33 may be horizontal, or it may have a slight angle to the horizontal as indicated in Figure 5. Figure 5 shows the lower edge slanted for clarity of illustration, but the slant is not necessary. In shearing broad sheets it is frequently desirable to have a slanted shear edge. But in the present case, the horizontal edge is preferred; the stock sheet is not very wide and, furthermore, only short lengths between the punch openings have to be sheared. Furthermore, the horizontal shear edge has the advantage of enabling the grinding of the shear edge and of the punches to be carried out the same time, since all cutting edges of punches and shear blade are located in the same horizontal plane. This provides lower maintenance cost.

To help explain the operation of the press, it is helpful to lay out the stock into straight longitudinal columns and straight transverse rows of pieces to indicate where successive passes will shear and punch. The rows are lettered, for convenience, A to F and the columns are lettered R to Z, in Figures 6–10. Certain pieces are formed wholly by the punching operation; others are formed partly by punching and partly by shearing. The "punched out" pieces are shown specially shaded in Figure 10 to distinguish more easily from the "sheared" pieces which are unshaded in this figure.

The operation is as follows: Assuming a new piece of stock, the stock is fed by hand, when the head 25 is in upper position, until the forward edge of the stock engages stop 24. Downward movement of the head 25 causes the shear 33 to cut off strip A in Figures 6 and 7; it also causes the hexagonal punches 26 to punch out the hexes indicated by 38 and the pentagonal punches 27 to punch out the end scraps 37.

The head 25 then rises and the stock is fed in until it again engages stop 24. The head drops again, this time severing row B and punching hexes 41 and end scraps 40, as indicated in Figures 8 and 9.

The head 25 then rises and the stock is fed in until it again engages stop 24 when the head drops again. This time the shear severs the hexes of row C and the punches punch out the hexes 43 and end scraps 44, as indicated in Figure 10. The parts formed by the punching operation in this step are shown more heavily shaded in Figure 10 than those punched by subsequent steps which are more lightly shaded.

The head then rises and the stock is fed again until it engages stop 24 when the head drops again. This operation is repeated until the entire sheet stock is cut up into complete hexes and scrap. Parts formed by the punching operation in this and subsequent steps are shown more lightly shaded in Figure 10.

It will be noted that the first row A (Figure 6) on a new piece of stock is waste, as is also the second row B (Figure 8). From then on there is no scrap except the triangular end pieces (see 40 and 44) until the end of the stock strip is reached.

It will be noted that the several rows A, B, C, D, etc. are formed partly by the severing operation, while the unlettered rows, intermediate the lettered rows, are formed wholly by the punching operation.

It will be noted that the punching operation punches out every piece, in every other column; that is to say, the triangular waste pieces in end columns R and Z and the complete hexes in interior columns T, V and X. It will be noted too that the alternate columns S, U, W and Y are formed, partly by the punching operation, and partly by the severing operation.

It will be noted that the columns T, V and X of punched hexes and the end columns R and Z of scrap fashion the advancing margin of the stock sheet into projecting legs of partially completed hexes (see row C in Figure 10); and that these hexes are completed by the shearing operation.

Thus the "punched out" hexes have all six sides formed by the punching operation; the "sheared" hexes have four sides formed by the punching operation and the remaining sides formed by the shearing operation.

The diagrams of Figures 6, 8 and 10 are helpful also to illustrate the relationship and distance between the several punches and dies and the severing edges. The inner hexagonal punches 26 are in register with the hexes 43 (Fig. 10) and the end punches 27 are in register with the end scraps 44. The adjacent corners of these punches (and of their cooperating die openings) are spaced apart a distance M (Fig. 8) equal to the length of one side of a hex.

The straight line passing through the centers of the punches parallel to the shear edge 34, and the distance between these parallel lines is equal to the distance N (Fig. 8) across the flats of a hexagonal blank. The line of movement of the sheet stock through the machine is horizontal and perpendicular to these aforesaid parallel lines; certain flat sides of the hexes are parallel to said parallel lines.

Advantages of the present invention are the simplified structure, simplified operation and saving in scrap. The movement of the press and of the stock completely cuts up the entire blank. The only metal scrap resulting from the present process is that formed at the beginning and end of the stock strip, and the small triangular segments removed from the edges of the sheet.

The mechanism of the press may be modified, if desired, to cause the shearing step to occur at a different stage from the punching step, while retaining the shear and punches in the same machine. The shearing operation may also be carried out by a separate shearing machine arranged in tandem with a separate punch press, and operated synchronously therewith. The stock may be fed by automatic feed apparatus instead of by hand.

The above described hexagonal blanks are equilateral. The present invention is also applicable to the production of hexagonal blanks which are not equi-lateral, but in which the hexagon is elongated, either in width or length. The invention is also applicable to production of square and oblong blanks. In all cases the rows and columns of blanks will be arranged to have two straight sides of each blank in such position, with respect to the line of feed of the blank, that they may be formed by the shearing operation. In all cases, too, the blank fit together to form a solid sheet, thereby eliminating waste between the blanks.

While certain novel features of the invention have been disclosed herein, and are pointed out in the annexed claims, it will be understood that various omissions, substitutions and changes may be made by those skilled in the art without departing from the spirit of the invention.

What is claimed is:

1. The method of forming hexagonal blanks and scrap blanks from a sheet strip which comprises arranging the cutting mechanism so that the blanks are laid out in columns extending lengthwise of the sheet with certain flat sides of hexagonal blanks perpendicular to the length of the sheet, said columns including inner columns of hexagonal blanks and marginal columns of scrap blanks, alternate columns of blanks having their angular corners interfitting the angular corners of those columns in between, said method comprising punching the scrap blanks of marginal columns and the hexagonal blanks of alternate columns, and shearing the blanks of columns between the punched columns at said flat sides.

2. The method of cutting hexagonal blanks from a strip, said method, in effect, dividing the strip into rows and columns of blanks, the columns comprising blanks with certain flat sides perpendicular to the length of the length of the strip, said method comprising simultaneously punching rows of consecutive adjoining blanks in alternate columns to form projecting, partially formed, but unsevered, hexagonal blanks in the intervening columns, and shearing said rows of said unsevered hexagonal blanks to complete the formation of said last-mentioned blanks.

3. A press comprising a die having a row of spaced hexagonal openings, certain flat sides of said openings being parallel to the length of the row, said openings being spaced apart a distance equal to the length of one side of a hexagonal blank, said die having a shearing edge spaced from the center line of said row of die openings a distance equal to the distance across the flats of a hexagonal blank, and a head comprising a row of hexagonal punches in register with said hexagonal die openings and a blade having a shearing edge cooperating with said die shearing edge.

4. A press comprising a die having a straight row of spaced openings, said openings comprising angular grooves in the end walls of the die and spaced inner hexagonal holes between said angular grooves, certain flat sides of said holes being parallel to the length of the row, said openings being spaced apart a distance equal to the length of one side of a hexagonal blank, an upper section having a row of inner hexagonal and outer end punches in register with their corresponding die openings, said die being split along the center line of said row of die openings.

5. A press comprising a die having a straight row of spaced openings, said openings comprising angular grooves in the end walls of said die and spaced inner hexagonal holes between said angular grooves, certain flat sides of said holes being parallel to the length of the row, said holes and openings being spaced apart a distance equal to the length of one side of a hexagonal blank, said die having a shearing edge spaced from the center line of said row of die openings a distance equal to the distance across the flats of a hexagonal blank, an upper section having a row of inner hexagonal and outer end punches in register with their corresponding die holes and openings, and a blade having a shearing edge cooperating with said die shearing edge, said punches and shearing blade having their lower cutting edges in the same plane.

EMILE BLAIR.

REFERENCES CITED

The following references are of record in the file of this patent:

UNITED STATES PATENTS

| Number | Name | Date |
|---|---|---|
| 444,918 | Mason et al. | Jan. 20, 1891 |
| 867,540 | Thomson | Oct. 1, 1907 |
| 1,588,174 | Dewald | June 8, 1926 |
| 2,302,571 | Ray | Nov. 17, 1942 |
| 2,406,155 | Messenger | Aug. 20, 1946 |